J. WITTEMANN.
UNIVERSAL JOINT.
APPLICATION FILED FEB. 9, 1914.
1,219,521.  Patented Mar. 20, 1917.
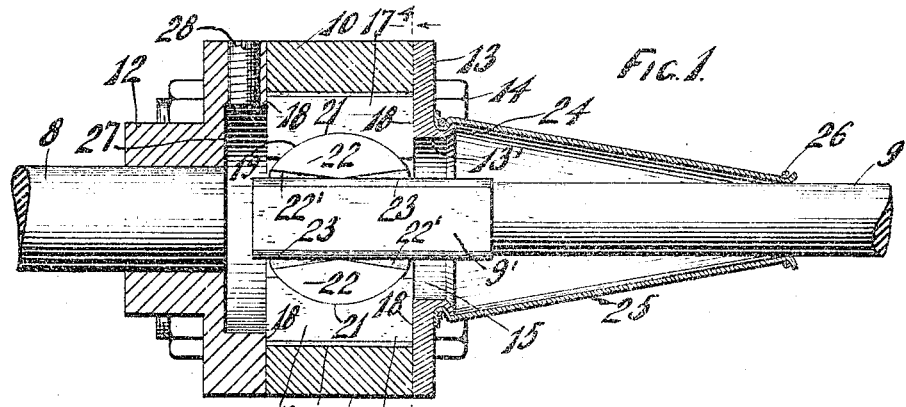
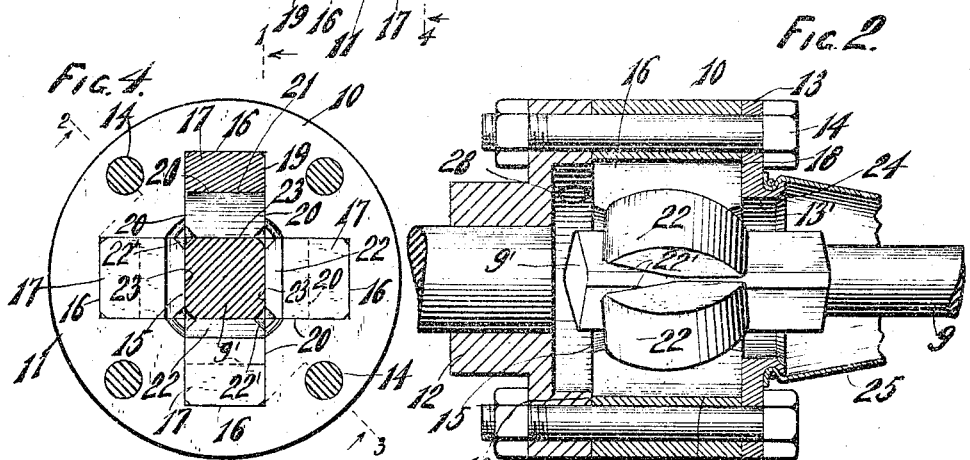
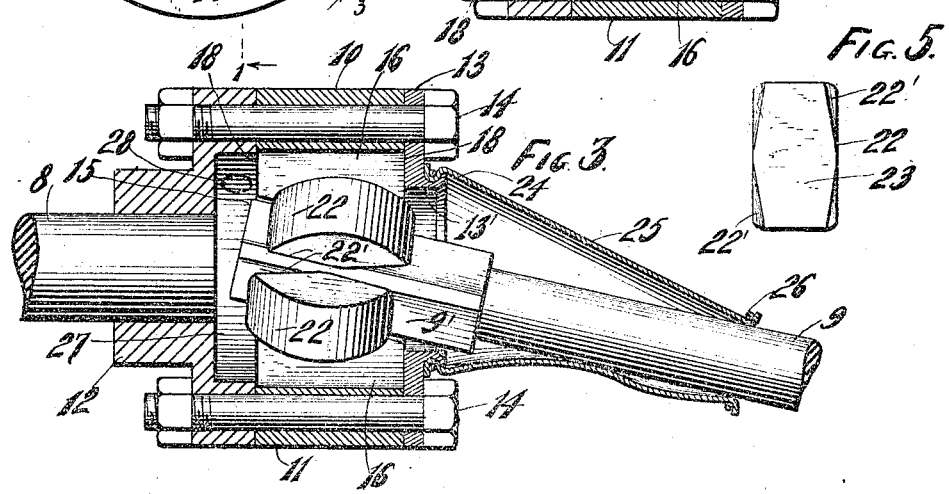
WITNESSES.  INVENTOR.

UNITED STATES PATENT OFFICE.

JOHN WITTEMANN, OF MILWAUKEE, WISCONSIN, ASSIGNOR OF ONE-THIRD TO FREDERICK S. HUNT, OF MILWAUKEE, WISCONSIN.

UNIVERSAL JOINT.

1,219,521.     Specification of Letters Patent.     Patented Mar. 20, 1917.

Application filed February 9, 1914. Serial No. 817,416.

*To all whom it may concern:*

Be it known that I, JOHN WITTEMAN, a citizen of the United States, and resident of Milwaukee, in the county of Milwaukee and State of Wisconsin, have invented new and useful Improvements in Universal Joints, of which the following is a description, reference being had to the accompanying drawings, which are a part of this specification.

This invention relates to improvements in universal joints.

It is one of the objects of the present invention to provide a universal joint in which the use of pivot bolts or pins is eliminated and a large area of bearing surface is provided in lieu thereof which is adapted to eliminate friction and reduce wear to a minimum.

A further object of the invention is to provide a universal joint constructed to permit an endwise movement of one or both connected members with relation to each other.

A further object of the invention is to provide a universal joint in which the working parts may be easily kept provided with a lubricant and protected from dust.

A further object of the invention is to provide a universal joint which is of simple construction, is strong and durable and is well adapted for the purpose desired.

With the above and other objects in view, the invention relates to the improved universal joint and its parts and combinations as set forth in the claims, and all equivalents thereof.

In the accompanying drawing in which the same reference characters indicate the same parts in all of the views:

Figure 1 is a vertical central longitudinal sectional view of the improved universal joint taken on line 1—1 of Fig. 4;

Fig. 2 is a longitudinal sectional view taken on line 2—3 of Fig. 4 with the parts revolved an eighth turn from the position shown in Fig. 1 and one of the shafts inclined downwardly;

Fig. 3 is a similar view thereof with the shaft shown in an inclined position;

Fig. 4 is a transverse sectional view thereof taken on line 4—4 of Fig. 1; and

Fig. 5 is a detail view of one of the curved blocks.

Referring to the drawing the numeral 8 indicates the driving shaft, 9 the driven shaft and 10 the coupling member or joint connecting the two together. The coupling member 10 could, if desired, be formed in one piece but for convenience of manufacture is formed in three parts, and comprises a grooved intermediate part 11, a hub part 12 and a cap part 13, the three parts being securely fastened together by bolts and nuts 14. The hub portion 12 is adapted to be mounted on the drive shaft 8 and is keyed or bolted thereto in the usual manner to form a tight connection.

The inner portion of the medial member 10 surrounding the opening or bore 15 is provided with recesses or slots 16 extending through the member in lines parallel with the bore which are adapted to receive four bearing members 17 therein. The bearing members are positioned diametrically opposite each other in pairs and each pair extends in a plane at right angles to the other pair and are held against endwise movement by the inner faces of the hub member 12 and the cap member 13 which form shoulders 18 covering portions of the ends of the slots. The inner faces 19 of the bearing members are curved in a plane parallel with the bore of the medial member and on the radius of a circle whose center is coincident with the axis of the shaft 9 which extends into the bore of said member.

The curved portions of the bearing members extend radially inwardly beyond the bore 15 of the medial member and in connection with the inner side walls 20 of said medial member form pockets 21 to receive segmental key blocks 22 mounted therein. The outer curved portions of the blocks are of the same radius as the curved portions of the bearing members and are of a width to snugly fit between the inner side walls of the pockets 21. The inner faces 23 of the segmental blocks are flat and the inner side corner edges of adjacent blocks just clear each other to permit the blocks in the same plane to rock in pairs.

The inner faces of the segmental blocks form a rectangular bore into which slidably extends the squared end 9' of the driven shaft 9 and is keyed to said coupling by the said blocks. The adjacent corner edges 22' of the segmental blocks are beveled and tapered from a medial point outwardly at an angle to permit the rocking movement of the blocks when the driven shaft is swung to an angle diagonally between the blocks as shown in Fig. 2 of the drawing.

The cap 13 is provided with a bore 13' of sufficient size to permit the universal oscillation of the driven shaft and a grooved hub portion 24 of said cap is adapted to have a tubular piece of flexible material 25, such as leather, connected thereto and also to the shaft 9 by a ring 26 to close the cap end of the coupling and provide for holding a lubricant (not shown) within the chamber 27 of the coupling and to keep the dust thereout.

A screw plug 28 is provided for filling the chamber with a lubricant.

In use the segmental blocks freely rock in their sockets when the two shafts are axially at an angle with relation to each other and are rotated and the driven shaft is also free to slide longitudinally between the blocks. As the radius of the segmental blocks is coincident with the axis of the driven shaft the blocks in rocking in their sockets by the angular movement of the driving shaft will slide longitudinally on said shaft and with relation to each other as shown in Fig. 4 in order to preserve the same dimension of the bore at all angles of movement of the shaft within the range of the coupling.

While the bearing blocks are shown as separate parts it is to be understood that they may be formed integral with the medial member without departing from the spirit and scope of the invention.

From the foregoing description it will be seen that the universal joint is of very simple construction and the parts are provided with comparatively large bearing surfaces and are well adapted for the purpose desired.

What I claim as my invention is:

1. A universal joint, comprising a coupling member having a bore and a plurality of recesses in the portion of the coupling surrounding the bore, the recesses each having a curved outer end wall and flat side walls, segmental blocks fitting within said recesses and having inner flat faces to form a rectangular supplemental bore, and a shaft having a flattened end portion which slidably fits within the supplemental bore, said blocks locking the parts rotatively together and independently slidably engaging the shaft.

2. A universal joint, comprising a coupling member having a bore and a plurality of recesses in the portion of the coupling surrounding the bore, the recesses each having a curved outer wall on the radius of a circle whose center is coincident with the axis of the coupling and parallel side walls, segmental blocks fitting within the recesses and having inner flat faces to form a rectangular supplemental bore, and a shaft having a rectangular end portion which slidably fits within the supplemental bore and is engaged on all its side faces by the segmental blocks, said blocks locking the parts rotatively together and independently slidably engaging the shaft.

3. A universal joint, comprising a coupling member having a bore and a plurality of recesses surrounding the bore, said recesses being curved in a plane parallel to the bore and on the radius of a circle whose center is coincident with the axis of the coupling, segmental blocks having flat side portions which closely fit the side walls of the recesses and curved portions which fit the curved walls of the recesses, said blocks also having flat inner faces which form a rectangular bore within the coupling, and a shaft having a flattened end portion which extends into the rectangular bore and is closely engaged on all of its side faces by the inner faces of the segmental blocks.

4. A universal joint, comprising a coupling member having a bore and a plurality of recesses diametrically oppositely positioned in pairs surrounding the bore, said recesses being curved in a direction on the radius of a circle whose center is coincident with the axis of the coupling in a plane parallel to the bore and having parallel side walls, segmental blocks having parallel sides and curved outer surfaces positioned within and closely fitting the walls of the recesses, said blocks also having flat inner faces which form a rectangular supplemental bore within the coupling, and a shaft having a rectangular end portion which extends into the rectangular bore and is slidably engaged on all of its side faces by the inner faces of the blocks.

5. A universal joint, comprising a coupling member having a bore and a plurality of recesses diametrically oppositely positioned in pairs surrounding the bore, said recesses being curved in a direction on the radius of a circle whose center is coincident with the axis of the coupling in a plane parallel to the bore and having parallel side walls, segmental blocks having parallel sides and curved outer surfaces positioned within and closely fitting the walls of the recesses, said blocks also having flat inner faces which form a rectangular supplemental bore within the coupling, a shaft having a rectangular end portion which extends into the rectangular bore and is slidably engaged on all of its side faces by the inner faces of the blocks, and a flexible closure closing the open portion of the bore of the coupling member between the said member and the shaft.

6. A universal joint, comprising a coupling member having a bore and a plurality of slots in the portion of the member surrounding the bore, bearing members fitting within said slots and having their inner faces curved in a direction on the radius of a circle whose center is coincident with the axis of the coupling in a plane parallel to the bore, the said curved portions and the side walls of the slots of the coupling member forming recesses, segmental blocks fitting within said recesses and having flat inner faces which form a rectangular supplemental bore within the coupling, and a shaft having a rectangular end portion which extends into the rectangular bore and is slidably engaged on all of its side faces by the inner faces of the blocks.

7. A universal joint, comprising a coupling member formed of a hub portion and a cap portion and an intermediate portion, the cap and intermediate portions being provided with bores and the intermediate portion also being provided with a plurality of slots surrounding the bore, means for connecting the three portions together, bearing members mounted within the slots and interposed between the hub and cap portions, the inner faces of said bearing members being curved in a direction on the radius of a circle whose center is coincident with the axis of the coupling member in a plane parallel with the bore, the said curved portions and the side walls of the slots of the coupling member forming recesses, segmental blocks fitting within said recesses and having flat inner faces which form a rectangular supplemental bore within the coupling, and a shaft having a rectangular end portion which extends into the rectangular bore and slidably engages the inner faces of the blocks.

8. A universal joint, comprising a coupling member formed of a hub portion and a cap portion and an intermediate portion, the cap and intermediate portions being provided with bores and the intermediate portion also being provided with a plurality of slots surrounding the bore, means for connecting the three portions together, bearing members mounted within the slots and interposed between the hub and cap portions, the inner faces of said bearing members being curved in a direction on the radius of a circle whose center is coincident with the axis of the coupling member in a plane parallel with the bore, the said curved portions and the side walls of the slots of the coupling member forming recesses, segmental blocks fitting within said recesses and having flat inner faces which form a rectangular supplemental bore within the coupling, a shaft having a rectangular end portion which extends into the rectangular bore and slidably engages the inner faces of the blocks, and a flexible closure closing the open portion of the bore of the coupling member between the said member and the shaft.

In testimony whereof, I affix my signature, in presence of two witnesses.

JOHN WITTEMANN.

Witnesses:
 KATHERINE HOLT,
 EMILY SCHOWALTER.